United States Patent
Lai et al.

(10) Patent No.: US 11,186,744 B2
(45) Date of Patent: Nov. 30, 2021

(54) FLEXIBLE CONTAINER COATING COMPOSITIONS

(71) Applicant: PPG Industries Ohio, Inc., Cleveland, OH (US)

(72) Inventors: Huy Lai, Cincinnati, OH (US); Kris M. Kazik, West Chester, OH (US); Keri Veres, Milford, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 15 days.

(21) Appl. No.: 16/598,398

(22) Filed: Oct. 10, 2019

(65) Prior Publication Data

US 2020/0040217 A1    Feb. 6, 2020

Related U.S. Application Data

(63) Continuation of application No. 14/934,550, filed on Nov. 6, 2015, now Pat. No. 10,472,538.

(51) Int. Cl.

| | |
|---|---|
| *C09D 167/00* | (2006.01) |
| *C09D 167/02* | (2006.01) |
| *C08G 63/91* | (2006.01) |
| *B05D 7/14* | (2006.01) |
| *B21D 22/20* | (2006.01) |
| *B21D 51/26* | (2006.01) |
| *B65D 1/16* | (2006.01) |
| *B65D 23/02* | (2006.01) |

(52) U.S. Cl.
CPC ............ *C09D 167/00* (2013.01); *B05D 7/14* (2013.01); *B21D 22/201* (2013.01); *B21D 51/26* (2013.01); *B65D 1/165* (2013.01); *B65D 23/02* (2013.01); *C08G 63/916* (2013.01); *C09D 167/02* (2013.01)

(58) Field of Classification Search
CPC .... C09D 167/02; C09D 167/00; C08K 5/092; B05D 7/14; B21D 22/201; B21D 51/26; B65D 1/165; B65D 23/02; C08G 63/916
See application file for complete search history.

(56) References Cited

U.S. PATENT DOCUMENTS

| | | | |
|---|---|---|---|
| 2,015,027 A * | 9/1935 | Finley | F02B 53/00 |
| | | | 123/244 |
| 4,176,143 A | 11/1979 | Kraft et al. | |
| 4,205,115 A | 5/1980 | Piccirilli et al. | |
| 5,288,559 A | 2/1994 | Oka et al. | |
| 5,688,598 A | 11/1997 | Keck et al. | |
| 5,952,452 A | 9/1999 | Aerts et al. | |
| 6,635,341 B1 * | 10/2003 | Barancyk | C08G 18/4692 |
| | | | 428/323 |
| 6,730,361 B2 | 5/2004 | Parekh et al. | |
| 8,133,557 B2 | 3/2012 | Parekh et al. | |
| 10,370,152 B2 * | 8/2019 | Han | B65D 65/42 |
| 10,472,538 B2 * | 11/2019 | Lai | C09D 167/02 |
| 2001/0051227 A1 * | 12/2001 | Jung | C09D 167/02 |
| | | | 427/486 |
| 2005/0014012 A1 | 1/2005 | Stapperfenne et al. | |
| 2007/0054140 A1 | 3/2007 | Mayr et al. | |
| 2012/0276315 A1 | 11/2012 | Michel et al. | |
| 2013/0052380 A1 | 2/2013 | Most et al. | |
| 2013/0280453 A1 | 10/2013 | Seneker et al. | |

FOREIGN PATENT DOCUMENTS

| | | |
|---|---|---|
| EP | 2773710 A1 | 9/2014 |
| TW | 201527389 A | 7/2015 |
| WO | 2015050755 A1 | 4/2015 |

OTHER PUBLICATIONS

Vylon Tech Data, 2005, 1 page.
Vylon Grades, 2005, 1 page.

* cited by examiner

*Primary Examiner* — Ling Siu Choi
*Assistant Examiner* — Gennadiy Mesh
(74) *Attorney, Agent, or Firm* — Michael J. Grese

(57) ABSTRACT

A coating composition includes: (a) 60 to 90 percent by weight of an active hydrogen-containing polyester having a number average molecular weight of at least 23,000, an acid value below 5 and a hydroxyl value below 10, (b) 0.1 to 10 percent by weight of a polyanhydride, and (c) 5 to 30 percent by weight of a curing agent reactive with the active hydrogens associated with (a) and (b), the percentages being based on weight of resin solids of the coating composition, where the reaction product of the coating composition forms a single coating without including a thermoplastic polymer. The coating composition is useful in coating food and beverage containers, particularly 2-piece cans formed by drawing and redrawing (DRD).

16 Claims, No Drawings

FLEXIBLE CONTAINER COATING COMPOSITIONS

FIELD OF THE INVENTION

This invention is directed to a novel coating composition and in particular to a coating composition which forms flexible and ductile finishes on metal.

BACKGROUND OF THE INVENTION

A current method for preparing cans utilized for packaging foodstuffs is to draw a flat aluminum or steel sheet into a low profile can body and then redraw this can into a deep can body by a second drawing step and optionally a bead is crimped on the open edge of the can. The can is then cleaned and a coating is sprayed on and baked. The cost of producing these cans can be substantially reduced by coating the aluminum or steel sheet before it is drawn with a flexible and ductile finish which will not fracture, crack or peel during the forming of the can. This eliminates the separate coating step after the can is formed. Currently, polyvinyl chloride coatings have been used as a formable finish on aluminum sheets. However, after forming the can and particularly after forming the bead, a large number of failures of the finish due to cracks and peeling of the finish have been noted.

SUMMARY OF THE INVENTION

In one embodiment, the invention relates to novel packaging articles, e.g., metal food and beverage cans. Such packages of the present invention include "two-piece" cans formed at least in part using aluminum substrate. These cans typically comprise a body portion and an end portion, wherein at least one of the body and end portions are aluminum and are coated on the interior or food-contacting surface with a coating composition of the present invention. Suitable coating compositions of the present invention comprise:
(a) 60 to 90 percent by weight of an active hydrogen-containing polyester having a number average molecular weight of at least 15,000, an acid value below 5 and a hydroxyl value below 10,
(b) 0.1 to 10 percent by weight of a polyanhydride having the following structural formula:

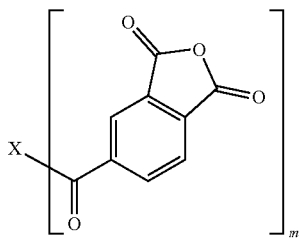

where m=2 to 4 and X is a divalent, trivalent or tetravalent organic group including mixed groups,
(c) 5 to 30 percent by weight of a curing agent reactive with the active hydrogens associated with (a) and (b); the percentages being based on weight of resin solids of the coating composition.

The present invention also provides a method of coating a metal can comprising:

(a) applying to a planar metal substrate a coating composition comprising:
(i) 60 to 90 percent by weight of an active hydrogen-containing polyester having a number average molecular weight of at least 15,000, an acid value below 5 and a hydroxyl value below 10,
(ii) 0.1 to 10 percent by weight of a polyanhydride having the following structural formula:

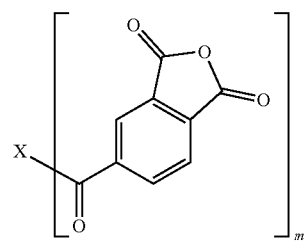

where m=2 to 4 and X is a divalent, trivalent or tetravalent organic group including mixed groups,
(iii) 5 to 30 percent by weight of a curing agent reactive with the active hydrogens associated with (i) and (ii); the percentages being based on weight of resin solids of the coating composition;
(b) curing the composition on the substrate to form a coating; and
(c) forming a metal can from the coated substrate.

DETAILED DESCRIPTION

Suitable polyester resins (a) for use in the coatings of the present invention include resins formed by the reaction of one or more polyacid molecules and one or more polyol molecules. They are typically prepared by condensation (esterification) according to known processes [see, for example, Zeno Wicks, Jr., Frank N. Jones and S. Peter Pappas, *Organic Coatings: Science and Technology*, Vol. 1, pp. 122-132 (John Wiley & Sons: New York, 1992)].

Suitable polyacids include adipic, azelaic, cyclohexane dicarboxylic, fumaric, isophthalic, maleic, phthalic, sebacic, succinic, terephthalic acids and anhydrides and esters thereof, and mixtures thereof.

Suitable polyol molecules include ethylene glycol, propylene glycol, butylene glycol, cyclohexane diol, cyclohexane dimethanol, hexane diol, substituted propane diols (e.g., 2-methyl, 1,3-propane diol), substituted butane diols, substituted pentane diols, substituted hexane diols, diethylene glycol and triols, and mixtures thereof.

Suitable polyesters for use in the present invention have relatively high molecular weights and low functionality. For example, the polyester should have a number average molecular weight of at least 15,000, such as at least 20,000, such as between 15,000 and 50,000 Daltons. The acid and hydroxyl functionality should be low, that is, an acid number of about 5 or below, such as about 2 or below, such as 2 to 5, and a hydroxyl number (OH number) of about 10 or below, such as about 8 or below, such as 5 to 10.

Polyesters suitable for use in the coating compositions of the invention are commercially available from Skybon as SKYBON ES215 and from Toyobo as VYLON 270.

The polyesters are present in the coating composition in amounts of 60 to 90, such as 70 to 85 percent by weight, based on resin solids content in the coating composition.

When used within the above mentioned ranges the polyesters provide for good flexibility in the resultant coating.

The second component of the resinous phase is a polyanhydride hardener prepared from trimellitic anhydride having the following structure:

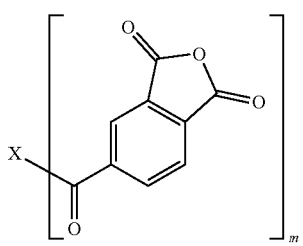

where m=2 to 4 and X is a divalent, trivalent or tetravalent organic group including mixed groups.

Typically, X is a group of the structure:

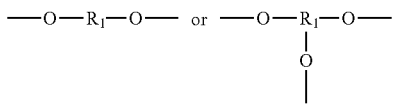

where $R_1$ is $C_2$ to $C_6$ alkylene such as ethylene, butylene, hexylene or $C_2$ to $C_3$ alkylidyne group such as ethylidyne and propylidyne. The polyanhydrides can be prepared by reacting trimellitic anhydride with a polyol such as ethylene glycol or glycerol including mixtures thereof. In the structure above, $R_1$ would be the residue of the polyol(s). The polyanhydrides are commercially available from Huntsman Corporation under the trademark ARADUR such as ARADUR 3380.

The polyanhydride is typically present in the coating composition in amounts of 0.1 to 10, such as 0.2 to 8 percent by weight based on weight of resin solids in the coating composition. Amounts less than 0.1 percent by weight do not provide for sufficient adhesion, whereas amounts greater than 10 percent by weight result in adhesion loss.

Also present in the coating composition is a curing agent (c), also called a crosslinking agent, that reacts with the active hydrogens (i.e., hydroxyl and carboxylic acid groups) of the polyester (a) and the polyanhydride (b). Examples of suitable curing agents are aminoplast or triazine-formaldehyde resin and phenolplast or phenol-formaldehyde resin.

The phenol-formaldehyde resins are preferably of the resol type.

Examples of suitable phenols are phenol itself, butyl phenol, xylenol and cresol. Cresol-formaldehyde resins, typically etherified with butanol, are often used. For the chemistry in preparation of phenolic resins, reference is made to "The Chemistry and Application of Phenolic Resins or Phenolplasts", Vol. V, Part I, edited by Dr. Oldring; John Wiley & Sons/Cita Technology Limited, London, 1997. Examples of commercially available phenolic resins are PHENODUR® PR285 and BR612 and those resins sold under the trademark BAKELITE®, typically BAKELITE 6581 LB.

Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Allenex AB.

The curing agent is typically present in the coating composition in amounts of 5 to 30, such as 10 to 25 percent by weight based on resin solids of the coating composition.

Optional ingredients can be included in the coating composition. Typically, the coating composition will contain a diluent, such as water, or an organic solvent or a mixture of water and organic solvent to dissolve or disperse the ingredients of the composition. The organic solvent is selected to have sufficient volatility to evaporate essentially entirely from the coating composition during the curing process such as during heating from 175-205° C. for about 5 to 15 minutes. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. For aqueous compositions, the acid groups of the resinous vehicle, such as (a) and/or (b) above or acid groups of an optional adjuvant resin can at least partially neutralized with an amine, typically a volatile amine to assist in the dispersion or dissolution of the resinous vehicle in the aqueous medium. When present, the diluent is used in the coating compositions in amounts of about 20 to 80, such as 30 to 70 percent by weight based on total weight of the coating composition.

Adjuvant resins such as epoxy-containing polymers, polyurethanes and/or (meth) acrylic polymers may be included in the coating compositions to maximize certain properties of the resultant coating. When present, the adjuvant resin is used in amounts of up to 50, typically 0.1-20 percent by weight based on weight of resin solids of the coating composition. A particularly desirable adjuvant resin is an epoxidized butadiene polymer. Such materials are described in U.S. Pat. No. 3,030,336. These polymers are substantially linear in structure having an epoxy oxygen content of 5-10 percent by weight, an epoxy equivalent weight of 300 to 3000 and a hydroxyl group content of 1 to 3 percent by weight. The epoxidized polybutadienes enhance the adhesion of the coating to the substrate and are typically present in amounts of 0.01 to 5.0, such as 0.05 to 1.0 percent by weight based on weight of resin solids in the coating composition.

Another optional ingredient that is typically present in the coating composition is a catalyst to increase the rate of cure or crosslinking of the coating compositions. Generally acid catalyst may be used and is typically present in amounts of about 0.05 to 5 percent by weight. Examples of suitable catalyst are dodecyl benzene sulfonic acid, methane sulfonic acid, paratoluene sulfonic acid, dinonyl naphthalene disulfonic acid and phenyl phosphonic acid.

Another useful optional ingredient is a lubricant, for example, a wax which facilitates manufacture of metal closures by imparting lubricity to the sheets of the coated metal substrate. Preferred lubricants include, for example, carnauba wax and polyethylene-type lubricants. If used, the lubricant is preferably present in the coating compositions of at least 0.1 percent by weight based on weight of resin solids in the coating composition.

Another useful optional ingredient is a pigment such as titanium dioxide. If used, the pigment is present in the coating compositions in amounts no greater than 70 percent by weight, preferably no greater than 40 percent by weight based on total weight of solids in the coating composition.

Surfactants can optionally be added to the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

In certain embodiments, the compositions used in the practice of the invention are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenol F and derivatives or residues thereof, including bisphenol F and bisphenol F diglycidyl ether ("BPFG"). The term "substantially free" as used in this context means the compositions contain less than 1,000 parts per million (ppm), "essentially free" means less than 100 ppm and "completely free" means less than 20 parts per billion (ppb) of any of the above-mentioned compounds, derivatives or residues thereof.

The coating compositions can be prepared by simply mixing the ingredients together typically with an organic diluent with high shear mixing. Pigments, if present, are typically first ground in one of the coating ingredients, such as the polyester (a) to form a paste and the paste added as a separate ingredient. The amount of diluent can be adjusted depending on the coating application method, for example, spraying or roll coating. Typically, the compositions have a resin solids content of 10 to 50, such as 20 to 40 percent by weight based on total weight of the composition.

The coating compositions of the present invention can be applied to packages of all sorts and are particularly well adapted for use on food and beverage metal cans, particularly 2-piece cans.

Two-piece cans are manufactured by joining a can body (typically a drawn metal body) with a can end (typically a drawn metal end). The coatings of the present invention are suitable for use in food contact situations and are typically used on the inside of such cans. Notably, the present coatings are well adapted for use in a coil coating operation. In this operation, a coil of a suitable substrate (e.g., aluminum or steel sheet metal) is first coated with the coating composition of the present invention (on one or both sides), cured (e.g., using a bake process), and then the cured substrate is formed (e.g., by stamping or drawing) into the can end or can body or both. The can end and can body are then sealed together with a food or beverage contained therein.

The forming process for the 2-piece can is typically the draw-redraw (DRD) process in which circular disks (blanks) are stamped out of the coated coil metal substrate. The disks are then drawn into a cup and in successive operations is further drawn with lengthening of the side walls. The DRD operation is accomplished in a few seconds.

The diameter of the starting blank and the height to diameter ratios, draw ratios, in the ensuing metal working process may be varied depending upon the desired size of the finished can. Also, as between different draw/redraw systems, the amount of draw in each step may be varied provided the cumulative effect of the plural draws produces the can of desired height and diameter. Tall food cans (height to diameter ratio more than 1.0) pass through a beading machine where the body has circumferential beads formed into it. The beads provide additional hoop strength to prevent implosion of the can during subsequent heat process cycles.

Besides aluminum, the coating compositions can be applied to other metal substrates such as tin-plated steel, tin-free steel and black-plated steel.

The coating is typically applied to the substrate with dry film weights of 2 to 20, such as 4 to 10 milligrams/square inch.

After application, the coating is then cured. Cure is effected by methods standard in the art. For coil coating, this is typically a short dwell time (i.e., 9 seconds to 2 minutes) at high heat (i.e., 485° F. (252° C.) peak metal temperature); coated metal sheets typically cure longer (i.e., 10 minutes) but at lower temperatures (i.e., 400° F. (204° C.) peak metal temperature).

As used herein, the molecular weights are on a number average basis as determined by gel permeation chromatography using polystyrene standards.

Food or foods include solid foodstuffs and liquid foodstuffs such as beverages.

As used herein, the following terms have the following meanings.

The term "organic group" means a hydrocarbon group (with optional elements other than carbon and hydrogen, such as oxygen, nitrogen, sulfur, and silicon).

The term "alkylene" or "alkylene group" refers to a straight or branched chain saturated divalent aliphatic group that may be substituted with hetero atoms such as nitrogen, oxygen and sulfur atoms.

The term "alkylidyne" or "alkylidyne group" refers to a straight or branched chain saturated trivalent aliphatic group that may be substituted with hetero atoms such as nitrogen, oxygen and sulfur atoms.

The term "package" means anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and redrawn and drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The term "food-contacting surface" refers to the surface of a package such as an inner surface of a food or beverage container that is in contact with, or intended for contact with, a food or beverage product. By way of example, an interior surface of a metal substrate of a food or beverage container, or a portion thereof such as a can end or a can body, is a food-contacting surface even if the interior metal surface is coated with a coating composition.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers) and oligomers.

Acrylic and methacrylic monomers and polymers are designated as (meth)acrylic monomers and polymers.

The term "comprises" and variations thereof do not have a limiting meaning where these terms appear in the description and claims.

As used herein, "a", "an", "the", "at least one" and "one or more" are used interchangeably. Thus, for example, a coating composition that comprises "a" polyether can be interpreted to mean that the coating composition includes "one or more" polyethers.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

EXAMPLES

The following examples are offered to aid in understanding of the present invention and are not to be construed as limiting the scope thereof. Unless otherwise indicated, all parts and percentages are by weight.

Polyester A

VYLON 270 from Toyobo, acid value less than 2, hydroxyl value 5, $M_n$ 23,000.

Polyester B

SKYBON ES-215 from Skybon, acid value less than 2, hydroxyl value 4, $M_n$ 35,000.

Pigment Paste C

The pigment paste was prepared from the following mixture of ingredients:

| Ingredient | Parts by Weight (ppw) |
|---|---|
| Polyester A | 10.4 |
| Hydrocarbon Solvent[1] | 12 |
| Hydrocarbon Solvent[2] | 18.5 |
| $TiO_2$[3] | 45.4 |

[1]SOLVESSO 100 from Exxon Mobile.
[2]SOLVESSO 150 from Exxon Mobile.
[3]TI-PURE R706 from Chemours.

The above ingredients were ground in a Cowles mixer until the $TiO_2$ was completely dispersed in the Polyester followed by the addition of 13.7 ppw of SOLVESSO 150.

Example 1

A coating composition was prepared from the following mixture of ingredients:

| Ingredient | PPW |
|---|---|
| Pigment Paste C | 25.5 |
| Polyester A | 9.9 |
| Polyester B | 47.9 |
| Methyl Ethyl Ketone | 9.0 |
| Aminoplast[1] | 4.5 |
| Catalyst[2] | 0.4 |
| Wax[3] | 1.5 |

[1]CYMEL 1123 from Allenex AB.
[2]NACURE 5076 from King Industries.
[3]MICROKLEAR 418 from Micro Powders.

The coating compositions were prepared by adding the above ingredients in the order listed under high shear mixing.

To the above coating composition was added various amounts of a polyanhydride ARADUR 3380-1 (trimellitic anhydride oligomer reaction product with ethylene glycol and glycerol available from Huntsman Corporation) to form six (6) coating compositions as shown in Table 1. To two of the coating compositions was added various amounts of an epoxidized polybutadiene available as POLY BD 605E from Cray Valley as shown in Table 1.

TABLE 1

| Example No. | ARADUR 3380-1 Level Based on Weight of Resin Solids in the Coating Composition | POLY BD 605E Level Based on Weight of Resin Solids in the Coating Composition |
|---|---|---|
| 1 | 0% | |
| 2 | 0.50% | |
| 3 | 1.60% | |
| 4 | 3.20% | |
| 5 | 4.80% | |
| 6 | 1.00% | 0.08% |
| 7 | 1.00% | 0.65% |

The coating compositions of Examples 1-7 were applied to flat aluminum sheets (33.02×21.59 cm) using a wire wound draw bar to a coating thickness of approximately 5 mg/inch. The coatings were cured in a gas-fired oven at 377° C. for 9 seconds.

An Erichsen cup is made by inserting the coated aluminum sheet as described above into two different sized dies which deeply draws the aluminum sheet into a tall, narrow cup (height to diameter ratio 1:1). The cup is then inserted into a beader which forms a ridge around the middle circumference of the cup (or sidewall). This is known as the bead. The cured coating was on the exterior of the cup.

The Erichsen cups were packed in a can containing an acidic brine solution, sealed and steam processed at 250° F. (121° C.) and 16 psi for 90 minutes. The cans were then cooled to room temperature, opened, the contents removed, and the exterior of the cups dried and evaluated for coating adhesion that was determined by applying SCOTCH brand 610 adhesive tape to the indicated portion of the container and pulling the tape from the substrate. A value of 10 indicates 100% of the coating remained. A value of 0 indicates 0% of the coating remained, i.e., all of the coating was removed.

The results of the testing are reported in Table 2 below.

TABLE 2

| Example No. | Bead | Sidewall Adhesion | Top Adhesion |
|---|---|---|---|
| 1 | 0 | 0 | 8 |
| 2 | 9 | 9 | 10 |
| 3 | 9 | 9 | 10 |
| 4 | 9 | 6 | 10 |
| 5 | 3 | 5 | 10 |
| 6 | 9 | 9 | 10 |
| 7 | 10 | 10 | 10 |

The data reported in Table 2 shows the incorporation of the polyanhydride in the coating composition improved the adhesion of the coating to the underlying substrate at three locations on the inside of the cup. The additional incorporation of the epoxidized polybutadiene marginally improved the adhesion.

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

What is claimed is:

1. A coating composition comprising:
   (a) 60 to 90 percent by weight of an active hydrogen-containing polyester having a number average molecular weight of at least 23,000, an acid value below 5 and a hydroxyl value below 10,
   (b) 0.1 to 10 percent by weight of a polyanhydride having the following structural formula:

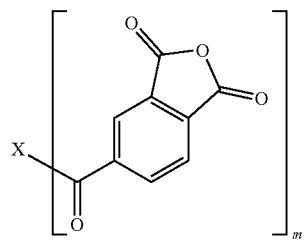

where m=2 to 4 and X is a divalent, trivalent or tetravalent organic group including mixed groups,
   (c) 5 to 30 percent by weight of a curing agent reactive with the active hydrogens associated with (a) and (b), the percentages being based on weight of resin solids of the coating composition, wherein the reaction product of the coating composition forms a single coating without including a thermoplastic polymer.

2. The coating composition of claim 1 in which the polyester has a number average molecular weight of at least 23,000 and up to 50,000, an acid value below 2 and a hydroxyl value below 8.

3. The coating composition of claim 1 in which X is a group of the structure:

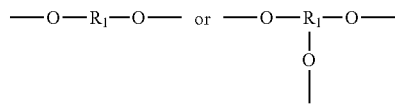

where R1 is $C_2$ to $C_6$ alkylene or $C_2$ to $C_3$ alkylidyne.

4. The coating composition of claim 3 in which R1 is a mixed organic group comprising $C_2$ to $C_6$ alkylene and $C_2$ to $C_3$ alkylidyne.

5. The coating composition of claim 1 in which the curing agent is an aminoplast.

6. The coating composition of claim 1 further comprising an epoxidized polybutadiene polymer.

7. A coating composition comprising:
   (i) a reaction product produced from a reaction mixture comprising:
   a) a first active hydrogen-containing polyester having a number average molecular weight of at least 15,000, an acid value below 5 and a hydroxyl value below 10;
   b) a second active hydrogen-containing polyester different from the first active hydrogen-containing polyester and having a number average molecular weight of at least 23,000, an acid value below 5 and a hydroxyl value below 10, wherein the first active hydrogen-containing polyester and the second active hydrogen-containing polyester together comprise 60 to 90 percent by weight;
   c) 0.1 to 10 percent by weight of a polyanhydride having the following structural formula:

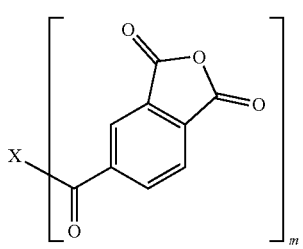

where m=2 to 4 and X is a divalent, trivalent or tetravalent organic group including mixed groups, d) 5 to 30 percent by weight of a curing agent reactive with the active hydrogens associated with (a) and (b); and (ii) an epoxidized polybutadiene polymer;

the percentages being based on weight of resin solids of the coating composition, wherein the reaction product of the coating composition forms a single coating without including a thermoplastic polymer.

8. The coating composition of claim 7, wherein the second active hydrogen-containing polyester has an acid value of below 2.

9. A method of coating a metal can comprising:

a) applying to a planar metal substrate the coating composition of claim 1;

b) curing the composition on the substrate to form a coating; and c) forming a metal can from the coated substrate.

10. The method of claim 9 in which the metal can is a seamless two-piece can.

11. The method of claim 9 in which the metal can is formed by drawing and redrawing.

12. A method of coating a metal can comprising:

a) applying to a planar metal substrate the coating composition of claim 7;

b) curing the composition on the substrate to form a coating; and c) forming a metal can from the coated substrate.

13. The method of claim 12 in which the metal can is a seamless two-piece can.

14. The method of claim 12 in which the metal can is formed by drawing and redrawing.

15. A coated can comprising:

a can body; and a single coating layer coated onto at least a portion of the can body, the coating layer comprising the reaction product of the coating composition of claim 1.

16. A coated can comprising:

a can body; and a single coating layer coated onto at least a portion of the can body, the coating layer comprising the reaction product of the coating composition of claim 7.

\* \* \* \* \*